(12) United States Patent
Moyne (10) Patent No.: US 9,582,828 B2
(45) Date of Patent: Feb. 28, 2017

(54) METHOD AND APPARATUS FOR OPTIMIZING PROFIT IN PREDICTIVE SYSTEMS

(71) Applicant: Applied Materials, Inc., Santa Clara, CA (US)

(72) Inventor: James R. Moyne, Canton, MI (US)

(73) Assignee: Applied Materials, Inc., Santa Clara, CA (US)

(*) Notice: Subject to any disclaimer, the term of this patent is extended or adjusted under 35 U.S.C. 154(b) by 343 days.

(21) Appl. No.: 14/341,464

(22) Filed: Jul. 25, 2014

(65) Prior Publication Data

US 2015/0039552 A1 Feb. 5, 2015

Related U.S. Application Data

(60) Provisional application No. 61/862,258, filed on Aug. 5, 2013.

(51) Int. Cl.
| | | |
|---|---|---|
| *G06F 9/44* | (2006.01) | |
| *G06N 7/02* | (2006.01) | |
| *G06N 7/06* | (2006.01) | |
| *G06Q 40/00* | (2012.01) | |

(52) U.S. Cl.
CPC .................. *G06Q 40/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,469,361 A | * | 11/1995 | Moyne ............ | G05B 19/41835 700/169 |
| 7,099,782 B2 | * | 8/2006 | Hitchcock ........... | G01M 13/028 702/56 |
| 7,124,059 B2 | * | 10/2006 | Wetzer ............... | G05B 23/0283 361/725 |
| 7,269,569 B2 | * | 9/2007 | Spira ..................... | G06Q 10/04 705/7.36 |

(Continued)

OTHER PUBLICATIONS

Diagnosing wind turbine faults using machine learning techniques applied to operational data Kevin Leahy; R. Lily Hu; Ioannis C. Konstantakopoulos; Costas J. Spanos; Alice M. Agogino 2016 IEEE International Conference on Prognostics and Health Management (ICPHM) Year: 2016 pp. 1-8, DOI: 10.1109/ICPHM.2016.7542860 IEEE Conference Publications.*

Leveraging Advanced Process Control (APC) technology in developing Predictive Maintenance (PdM) systems James Moyne; Nick Ward; Parris Hawkins 2012 SEMI Advanced Semiconductor Manufacturing Conference Year: 2012 pp. 221-226, DOI: 10.1109/ASMC.2012.6212893 IEEE Conference Publications.*

(Continued)

*Primary Examiner* — Michael B Holmes
(74) *Attorney, Agent, or Firm* — Patterson + Sheridan, LLP (57) ABSTRACT

Techniques are disclosed for methods and apparatuses for forming for determining when to perform maintenance events. The technique comprises determining a first cost of false positives and a second cost of missed true positives. A Receive Operating Characteristic (ROC) of a prediction model is determined for the occurrence of an event. A survival function and prediction horizon is generated from the prediction model for the occurrence of an event. The operational area on the ROC is determined based on the first costs and second costs. A threshold is determined from the ROC and is applied to the survival function and prediction horizon. A maintenance event is triggered based on the threshold.

20 Claims, 7 Drawing Sheets

(56) References Cited

U.S. PATENT DOCUMENTS

| | | | | |
|---|---|---|---|---|
| 7,349,825 B1* | 3/2008 | Williams | ............... | G06Q 10/06 |
| | | | | 702/182 |
| 7,987,108 B2* | 7/2011 | Wetzer | ............... | G05B 23/0283 |
| | | | | 361/725 |
| 8,560,106 B2* | 10/2013 | Swyers | .............. | G05B 23/0283 |
| | | | | 700/106 |
| 8,620,714 B2* | 12/2013 | Williams | ........... | G06Q 10/0637 |
| | | | | 701/29.3 |
| 8,655,698 B2* | 2/2014 | West, II | ................. | G06Q 10/06 |
| | | | | 701/29.3 |
| 8,660,875 B2* | 2/2014 | Yedatore | ............ | G05B 23/0283 |
| | | | | 705/7.11 |
| 9,376,263 B2* | 6/2016 | Nancarrow | ............ | B65G 43/00 |

OTHER PUBLICATIONS

Reducing unscheduled plant maintenance delays; field test of a new method to predict electric motor failure G. T. Homce; J. R. Thalimer Cement Industry Technical Conference, 1995. XXXVII Conference Record., 1995 IEEE Year: 1995 pp. 49-60, DOI: 10.1109/CITCON. 1995.514243 IEEE Conference Publications.*

Deploying an Equipment Health monitoring dashboard and assessing predictive maintenance James Moyne; Jimmy Iskandar; Parris Hawkins; Toysha Walker; Avi Furest; Bryan Pollard; David Stark ASMC 2013 SEMI Advanced Semiconductor Manufacturing Conference pp. 105-110, DOI: 10.1109/ASMC.2013.6552784 IEEE Conference Publications.*

* cited by examiner

METHOD AND APPARATUS FOR OPTIMIZING PROFIT IN PREDICTIVE SYSTEMS

CROSS-REFERENCE TO RELATED APPLICATIONS

This application claims benefit of U.S. Provisional Application Ser. No. 61/862,258, filed Aug. 5, 2013, of which is incorporated by reference in its entirety.

BACKGROUND

Field of the Invention

The present invention relates generally to computer science and, more specifically, to predicting unscheduled events in manufacturing.

Description of the Related Art

The classical breakdown of economic sectors fall into the retrieval and production of raw materials, such as food and iron; the transformation of the raw materials into intermediate materials or goods, such as computers, vehicles and clothing; and supplying services to consumers such as legal or bank. At least the first two sectors rely on machines to produce or fabricate the goods which enter the marketplace. Time and materials are a major consideration in the added costs of goods entering the market place. These added costs come from materials wasted due to defects and time spent in both fabricating and maintaining the equipment for fabrication.

Reducing wasted material and time spent on producing goods directly affect the cost of manufacturing and benefit the industry and consumer alike. The time spent on producing goods may include scheduled downtime for maintaining the equipment or unscheduled downtime in response to unexpected or unforeseen failures in the manufacturing equipment or process or a component of either. Unscheduled downtime is a major source of lost revenue in all of manufacturing. Conventionally, manufacturers have scheduled maintenance to reduce material defects associated with worn equipment and unscheduled downtime due to equipment failure. The latter can result in lost and more variable productivity, lower and more variable product quality, higher replacement part inventory costs, higher repair human resourcing costs, product scrap, and costly damage to equipment and equipment components.

With the on-going pressures of lowering cost, improving quality and reducing variability in the face of larger wafers and smaller feature sizes, the nano-manufacturing industry has begun to embrace a move from a reactive to predictive paradigm of operation. Predictive capabilities such as predictive maintenance (PdM) are cited by the International Technology Roadmap for Semiconductors (ITRS) as critical technologies to incorporate into production, with PdM identified as a key component to reduce unscheduled downtime, maintain high quality, and reduce cost. Predictive maintenance, also called Predictive and Preventative Maintenance (PPM), is the technique of relating facility state information to maintenance information to predict the need for maintenance events that will alleviate unscheduled downtime or reduce the frequency of scheduled downtime in conservative downtime scheduling situations.

Figure 1:
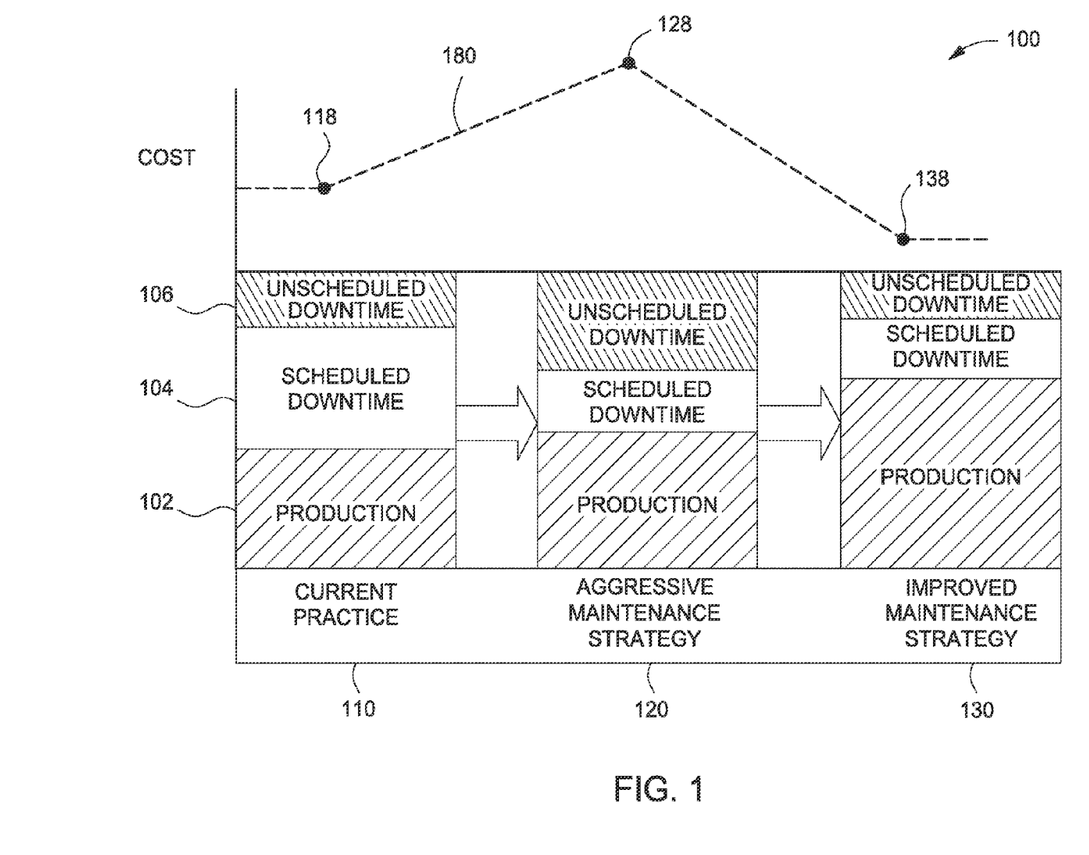
FIG. 1 is a hybrid of a bar chart/line graph illustrating the cost benefit for Predictive and Preventative Maintenance.

A key barrier to the effective implementation of predictive technologies (including PdM, predictive scheduling, predictive yield and virtual metrology) is an ability to guarantee to some level that the benefits to be provided by the technology will outweigh the operational costs. FIG. 1 is a hybrid of a bar chart/line graph 100 illustrating the cost benefit 180 for Predictive and Preventative Maintenance. The graph 100 illustrates the costs 180 for a conventional method 110 and an aggressive method 120 for performing preventative maintenance. The cost 180 for the conventional method 110 has a larger scheduled downtime 104, a smaller production 102, and a smaller unscheduled downtime 106 than the aggressive method 120. A cost 118 for the conventional method 110 is less than a cost 128 for the aggressive method 120 even with the greater production 102. Thus, the costs 118 of avoiding unscheduled downtime 104 by scheduling downtime 104 will out-weight the costs 128 associated with greater production 102 and greater unscheduled downtime 106. To reduce a cost 138 further, a proper balance may be determined for a new and improved method 130 by predicting unscheduled downtime 106 prior to it occurring.

Therefore, there is a need for an improved method for determining when unscheduled downtime may occur before it actually occurs for substantially reducing associated costs.

SUMMARY

Techniques are disclosed for methods and apparatuses for forming for determining when to perform maintenance events. The technique comprises determining a first cost of false positives and a second cost of missed true positives. A Receive Operating Characteristic (ROC) of a prediction model is determined for the occurrence of an event. A survival function is generated from the prediction model for the occurrence of an event. The operational area on the ROC is determined based on the first costs and second costs. A threshold is determined from the ROC and is applied to the survival function. A maintenance event is triggered based on the threshold.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

It is to be noted, however, that the appended drawings illustrate only exemplary embodiments of this disclosure and are therefore not to be considered limiting of its scope, for the disclosure may admit to other equally effective embodiments.

DETAILED DESCRIPTION

The embodiments herein, tie the facility costs and cost ratios to the predictive model receive operating characteristic (ROC) curve. The optimum point of operation on the curve is determined based on comparing customer costs for providing a false prediction and missing a prediction; for example PdM might compare costs for scheduled downtime, unscheduled downtime, and downtime where there is nothing wrong with the tool. These costs and cost ratios vary from process-to-process, customer-to-customer and even over time. One embodiment allows the optimum point of operation to be calculated and re-calculated as necessary to optimize operating profit.

The PdM system solves the problem of tuning predictive systems to the operating cost functions associated with the target tool. Thus, the PdM system maximizes the profit potential and minimizes the risk associated with predictive system deployment. The PdM system may also provide additional benefits such as reducing scrap rates while increasing quality, increasing throughput and factory capacity (i.e., productivity), enabling more efficient just-in-time management of spare chamber components which reduces costs and frees warehousing space, and reducing costly damage to equipment and equipment components.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized for storing a program product which, when executed, is configured to perform method for scheduling a preventative maintenance event. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, radio, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, SMALLTALK™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access applications (e.g., predictive maintenance system) or related data available in the cloud. For example, the predictive maintenance system engine could execute on a computing system in the cloud. In such a case, the predictive maintenance system could maintain spatial and non-spatial data at a storage location in the cloud. Doing so allows a user to access this information from any computing system attached to a network connected to the cloud (e.g., the Internet).

Figure 2:
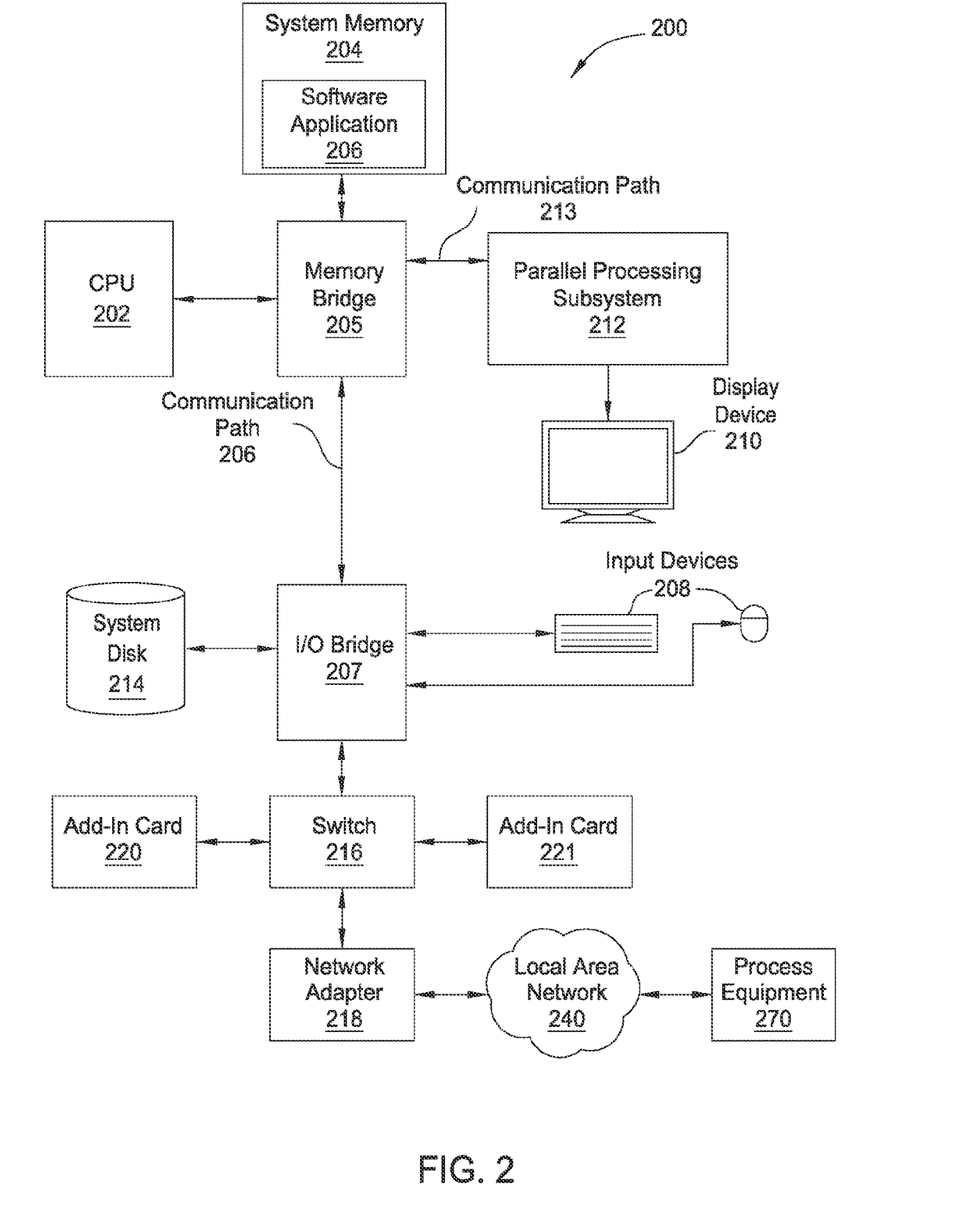
FIG. 2 is a block diagram of a system configured to implement one or more aspects of the invention.

FIG. 2 depicts one architecture of a PdM system 200 within which embodiments of the present invention may be implemented. This figure in no way limits or is intended to limit the scope of the present invention. PdM system 200 may be a personal computer, industrial processor, personal digital assistant, mobile phone, mobile device or any other device suitable for practicing one or more embodiments of the present invention.

As shown, PdM system 200 includes a central processing unit (CPU) 202 and a system memory 204 communicating via a bus path that may include a memory bridge 205. CPU 202 includes one or more processing cores, and, in operation, CPU 202 is the master processor of PdM system 200, controlling and coordinating operations of other system components. System memory 204 stores a software application 206, and data, for use by CPU 202. CPU 202 runs software applications and optionally an operating system. Memory bridge 205, which may be, e.g., a Northbridge chip, is connected via a bus or other communication path (e.g., a HyperTransport link) to an I/O (input/output) bridge 207. I/O bridge 207, which may be, e.g., a Southbridge chip, receives user input from one or more user input devices 208 (e.g., keyboard, mouse, joystick, digitizer tablets, touch pads, touch screens, still or video cameras, motion sensors, and/or microphones) and forwards the input to CPU 202 via memory bridge 205.

A display processor 212 is coupled to memory bridge 205 via a bus or other communication path (e.g., a PCI Express, Accelerated Graphics Port, or HyperTransport link); in one embodiment display processor 212 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 204.

Display processor 212 periodically delivers pixels to a display device 210 (e.g., a screen or conventional CRT, plasma, OLED, SED or LCD based monitor or television). Additionally, display processor 212 may output pixels to film recorders adapted to reproduce computer generated images on photographic film. Display processor 212 can provide display device 210 with an analog or digital signal.

A system disk 214 is also connected to I/O bridge 207 and may be configured to store content and applications and data, such as a database library 215, for use by CPU 202 and display processor 212. System disk 214 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 216 provides connections between I/O bridge 207 and other components such as a network adapter 218 and various add-in cards 220 and 221. Network adapter 218 allows PdM system 200 to communicate with other systems via an electronic communications network, and may include wired or wireless communication over local area networks 240 and wide area networks such as the Internet.

Other components (not shown), including USB or other port connections, film recording devices, and the like, may also be connected to I/O bridge 207. For example, process equipment 270 may operate from instructions and/or data provided by CPU 202, system memory 204, or system disk 214. Communication paths interconnecting the various components in FIG. 2 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

The process equipment 270 may be one or more semi-conductor, solar, flat panel or LED processing tool. For example, process equipment 270 may be an etch chamber, a chemical vapor deposition chamber, a physical vapor deposition chamber, an implant chamber, an annealing chamber, a plasma treatment chamber, or other processing chamber, either alone or in combination with one or more other chambers.

In one embodiment, display processor 212 incorporates circuitry optimized for performing mathematical operations, including, for example, math co-processor, and may additionally constitute a graphics processing unit (GPU). In another embodiment, display processor 212 incorporates circuitry optimized for general purpose processing. In yet another embodiment, display processor 212 may be integrated with one or more other system elements, such as the memory bridge 205, CPU 202, and I/O bridge 207 to form a system on chip (SoC). In still further embodiments, display processor 212 is omitted and software executed by CPU 202 performs the functions of display processor 212.

Pixel data can be provided to display processor 212 directly from CPU 202. In some embodiments of the present invention, instructions and/or data representing a predictive analysis is provided to set of server computers, each similar to PdM system 200, via network adapter 218 or system disk 214. The servers may perform operations on subsets of the data using the provided instructions for analysis. The results from these operations may be stored on computer-readable media in a digital format and optionally returned to PdM system 200 for further analysis or display. Similarly, data may be output to other systems for display, stored in a database library 215 on the system disk 214, or stored on computer-readable media in a digital format.

Alternatively, CPU 202 provides display processor 212 with data and/or instructions defining the desired output images, from which display processor 212 generates the pixel data of one or more output images, including characterizing and/or adjusting the offset between stereo image pairs. The data and/or instructions defining the desired output images can be stored in system memory 204 or graphics memory within display processor 212.

CPU 202 and/or display processor 212 can employ any mathematical, function or technique known in the art to create one or more results from the provided data and instructions, including predictive analysis relating facility state information to maintenance information to predict the need for maintenance events.

It will be appreciated that the system shown herein is illustrative and that variations and modifications are possible. The connection topology, including the number and arrangement of bridges, may be modified as desired. For instance, in some embodiments, system memory 204 is connected to CPU 202 directly rather than through a bridge, and other devices communicate with system memory 204 via memory bridge 205 and CPU 202. In other alternative topologies display processor 212 is connected to I/O bridge 207 or directly to CPU 202, rather than to memory bridge 205. In still other embodiments, I/O bridge 207 and memory bridge 205 might be integrated into a single chip. The particular components shown herein are optional; for instance, any number of add-in cards or peripheral devices might be supported. In some embodiments, the process equipment 270 may be connected directly to the I/O bridge 207. In some embodiments, switch 216 is eliminated, and network adapter 218 and add-in cards 220, 221 connect directly to I/O bridge 207.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The PdM system 200 may be configured to operate a PdM system equally applicable to fabrication, manufacturing or other operations having associated costs for process downtime or interruptions which may benefit from an improved method for predictive scheduling. One example application which may benefit from predictive scheduling is the manufacturing of substrates in a processing chamber.

Figure 3:
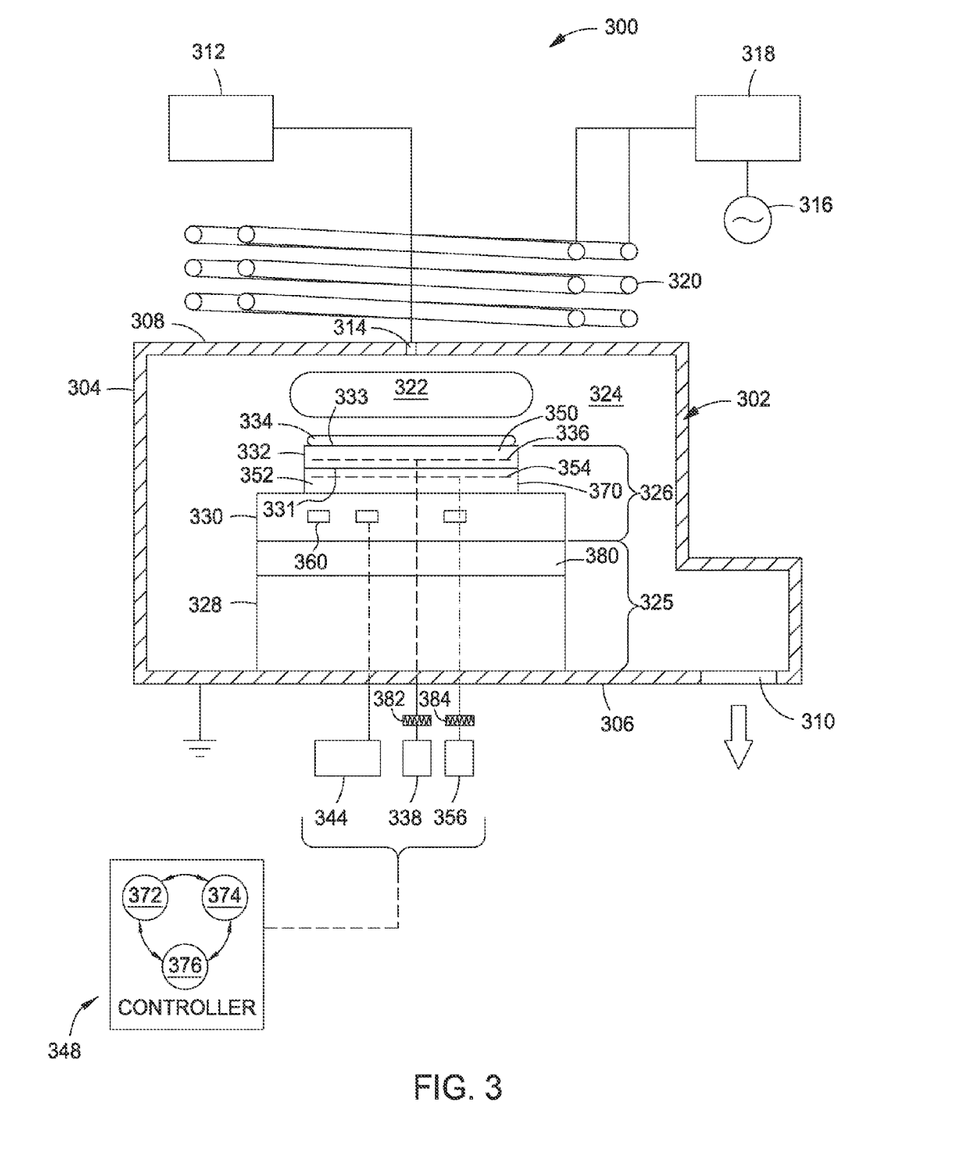
FIG. 3 is a cross-sectional schematic view of a processing chamber in which one or more aspects of the invention may be implemented.

FIG. 3 is a cross-sectional schematic view of a processing chamber 300 in which one or more aspects of the invention may be implemented. The processing chamber 300 may be a plasma treatment chambers, annealing chambers, physical vapor deposition chambers, chemical vapor deposition chambers, and ion implantation chambers, among others, as well as other fabrication systems for a substrate. Reducing unscheduled downtime and relaxing scheduled downtime in the fabrication system substantially reduces fabrication defects, fabrication downtime, and fabrication costs while substantially increases fabrication yield and quality.

The processing chamber 300 includes a grounded chamber body 302. The chamber body 302 includes walls 304, a bottom 306 and a lid 308 which enclose an internal volume 324. A substrate support assembly 326 is disposed in the internal volume 324 and supports a substrate 334 thereon during processing.

The walls 304 of the processing chamber 300 include an opening (not shown) through which the substrate 334 may be robotically transferred into and out of the internal volume 324. A pumping port 310 is formed in one of the walls 304 or the bottom 306 of the chamber body 302 and is fluidly connected to a pumping system (not shown). The pumping system is utilized to maintain a vacuum environment within the internal volume 324 of the processing chamber 300, while removing processing byproducts.

A gas panel 312 provides process and/or other gases to the internal volume 324 of the processing chamber 300 through one or more inlet ports 314 formed through at least one of the lid 308 or walls 304 of the chamber body 302. The process gas provided by the gas panel 312 are energized within the internal volume 324 to form a plasma 322 utilized to process the substrate 334 disposed on the substrate support assembly 326. The process gases may be energized by RF power inductively coupled to the process gases from a plasma applicator 320 positioned outside the chamber body 302. In the embodiment depicted in FIG. 3, the plasma applicator 320 is a pair of coaxial coils coupled through a matching circuit 318 to an RF power source 316.

A controller 348 is coupled to the processing chamber 300 to control operation of the processing chamber 300 and processing of the substrate 334. The controller 348 may be one of any form of general-purpose data processing system that can be used in an industrial setting for controlling the various subprocessors and subcontrollers. Generally, the controller 348 includes a central processing unit (CPU) 372 in communication with memory 374 and input/output (I/O) circuitry 376, among other common components. Software commands executed by the CPU of the controller 348, cause the processing chamber to, for example, introduce an etchant gas mixture (i.e., processing gas) into the internal volume 324, form the plasma 322 from the processing gas by application of RF power from the plasma applicator 320, and etch a layer of material on the substrate 334.

The substrate support assembly 326 generally includes at least a substrate support 332. The substrate support 332 may be a vacuum chuck, an electrostatic chuck, a susceptor, or other workpiece support surface. In the embodiment of FIG. 3, the substrate support 332 is an electrostatic chuck and will be described hereinafter as the electrostatic chuck 332. The substrate support assembly 326 may additionally include a heater assembly 370 and a cooling base 330. The cooling base may alternately be separate from the substrate support assembly 326. The substrate support assembly 326 may be removably coupled to a support pedestal 325. The support pedestal 325, which may include a pedestal base 328 and a facility plate 380, is mounted to the chamber body 302. The substrate support assembly 326 may be periodically removed from the support pedestal 325 to allow for refurbishment of one or more components of the substrate support assembly 326.

The facility plate 380 is configured to accommodate a plurality of driving mechanism configured to raise and lower a plurality of lifting pins. Additionally, the facility plate 380 is configured to accommodate the plurality of fluid connections from the electrostatic chuck 332 and the cooling base 330. The facility plate 380 is also configured to accommodate the plurality of electrical connections from the electrostatic chuck 332 and the heater assembly 370. The myriad of connections may run externally or internally of the substrate support assembly 326 while the facility plate 380 provides an interface for the connections to a respective terminus.

The electrostatic chuck 332 has a mounting surface 331 and a workpiece surface 333 opposite the mounting surface 331. The electrostatic chuck 332 generally includes a chucking electrode 336 embedded in a dielectric body 350. The chucking electrode 336 may be configured as a mono polar or bipolar electrode, or other suitable arrangement. The chucking electrode 336 is coupled through an RF filter 382 to a chucking power source 338 which provides a RF or DC power to electrostatically secure the substrate 334 to the upper surface of the dielectric body 350. The RF filter 382 prevents RF power utilized to form a plasma 322 within the processing chamber 300 from damaging electrical equipment or presenting an electrical hazard outside the chamber. The dielectric body 350 may be fabricated from a ceramic material, such as AlN or $Al_2O_3$. Alternately, the dielectric body 350 may be fabricated from a polymer, such as polyimide, polyetheretherketone, polyaryletherketone and the like.

The workpiece surface 333 of the electrostatic chuck 332 may include gas passages (not shown) for providing backside heat transfer gas to the interstitial space defined between the substrate 334 and the workpiece surface 333 of the electrostatic chuck 332. The electrostatic chuck 332 may also include lift pin holes for accommodating lift pins (both not shown) for elevating the substrate 334 above the workpiece surface 333 of the electrostatic chuck 332 to facilitate robotic transfer into and out of the processing chamber 300. Periodically the workpiece surface 333 may need refurbishing to maintain quality and consistency in the fabrication of substrates 334 disposed thereon during processing.

The temperature controlled cooling base 330 is coupled to a heat transfer fluid source 344. The heat transfer fluid source 344 provides a heat transfer fluid, such as a liquid, gas or combination thereof, which is circulated through one or more conduits 360 disposed in the cooling base 330. The fluid flowing through neighboring conduits 360 may be isolated to enabling local control of the heat transfer between the electrostatic chuck 332 and different regions of the cooling base 330, which assists in controlling the lateral temperature profile of the substrate 334.

A fluid distributor may be fluidly coupled between an outlet of the heat transfer fluid source 344 and the temperature controlled cooling base 330. The fluid distributor operates to control the amount of heat transfer fluid provided to the conduits 360. The fluid distributor may be disposed outside of the processing chamber 300, within the substrate support assembly 326, within the pedestal base 328 or other suitable location.

The heater assembly 370 may include one or more main resistive heaters 354 embedded in a body 352. The main resistive heaters 354 may be provided to elevate the temperature of the substrate support assembly 326 to a temperature for conducting chamber processes. The main resistive heaters 354 are coupled through an RF filter 384 to a main heater power source 356. The power source 356 may provide 900 watts or more power to the main resistive heaters 354. The controller 348 may control the operation of the main heater power source 356, which is generally set to heat the substrate 334 to about a predefined temperature. In one embodiment, the main resistive heaters 354 include a plurality of laterally separated heating zones, wherein the controller 348 enables one zone of the main resistive heaters 354 to be preferentially heated relative to the main resistive heaters 354 located in one or more of the other zones. For example, the main resistive heaters 354 may be arranged concentrically in a plurality of separated heating zones.

In one embodiment, the one or more main resistive heaters 354 may be formed in the electrostatic chuck 332. The substrate support assembly 326 may be formed without the heater assembly 370 and with the electrostatic chuck 332 disposed directly on the cooling base 330.

The electrostatic chuck 332 may include one or more thermocouples (not shown) for providing temperature feedback information to the controller 348 for controlling the power applied by the main heater power source 356 to the main resistive heaters 354 and for controlling the operations of the cooling base 330 among other components in the processing chamber 300.

In one embodiment, the processing chamber 300 engages in the fabrication of a plurality of substrates 334 which generates wear on, and/or contaminates, chamber components. The wear and/or contamination of the chamber components may result in substrates 334 out of specification or unsuitable for further operations. The processing chamber 300 is taken offline to replace and repair the worn and/or contaminated chamber components before placing the processing chamber 300 back online. During startup, after bringing the processing chamber 300 online, the substrates processed in the processing chamber 300 are inspected for defects for removal prior to the fabrication process stabilizing.

In one embodiment, the PdM system 200 determines the electrostatic chuck 332 of the processing chamber 300 may be safely kept in operation much longer than originally expected. The longer operation delays scheduled maintenance while not impacting unscheduled downtime allowing the manufacturer to take advantage of the additional production time and factory capacity which may add up to and exceed more than one million dollars. Using sensors and predictive techniques, the PdM system 200 is able to show that the parts of the processing chamber 300 has a much longer useful life than expected.

In another embodiment, the PdM system 200 is able to predict a failure mode attributable to leakage around the electrostatic chuck 332 of the processing chamber 300. A particular repair kit is utilized for refurbishing of the chuck in this case and particular human resources may be required. The PdM system 200 is able to provide advanced warning of failure of 1000 wafers. With this information the user of processing chamber 300 is able to (1) schedule maintenance to minimize throughput disruption, (2) avoid any wafer scrap associated with unforeseen electrostatic chuck failure due to leakage, (3) reduce yield degradation and loss due to electorstatic chuck leakage failure, (4) schedule repair or replacement kit inventory and human resource resulting in reduced inventory and human resource cost, and reduced mean-time-to-repair, (5) and reduce the mean-time-to-repair by eliminating the time needed to diagnosis a failure to determine the root cause and associated repair needed.

Figure 4:
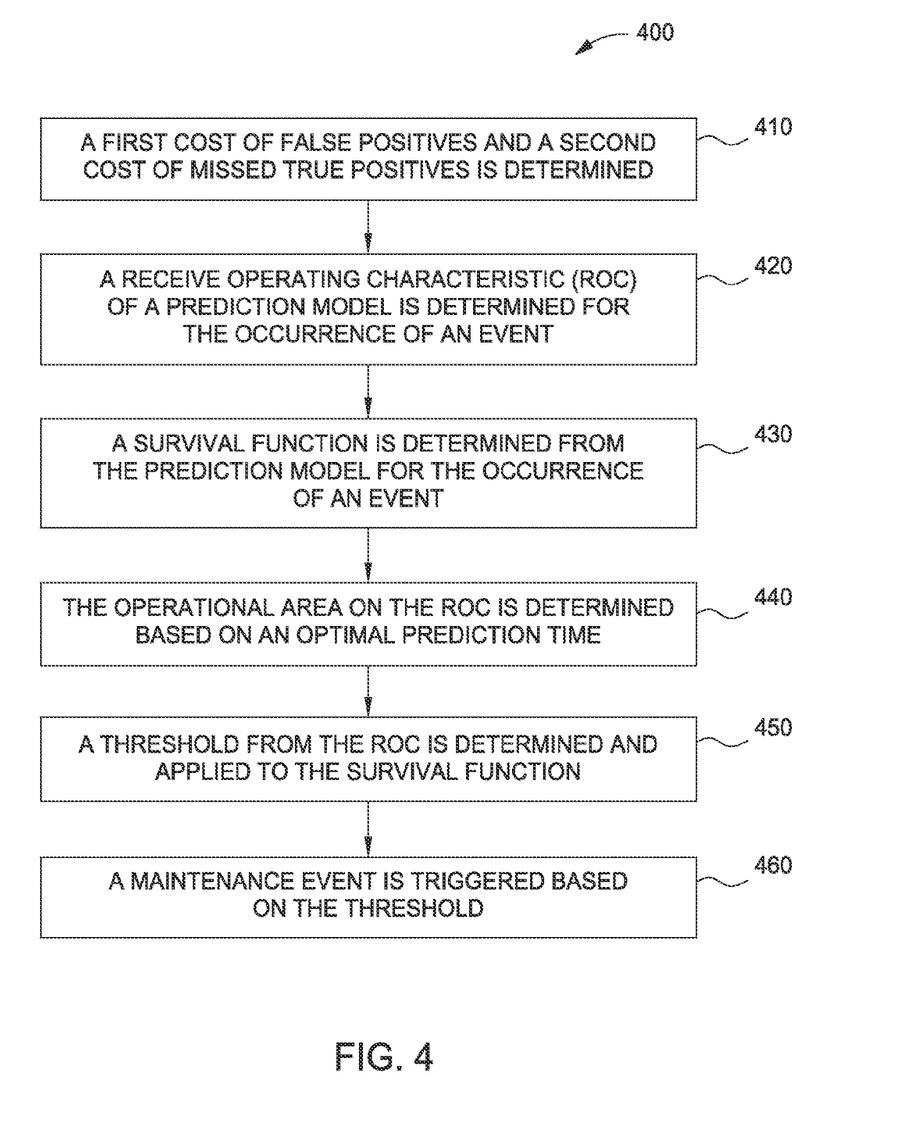
FIG. 4 illustrates a method for calculating a cost for determining when to perform a maintenance event.
Figure 5:
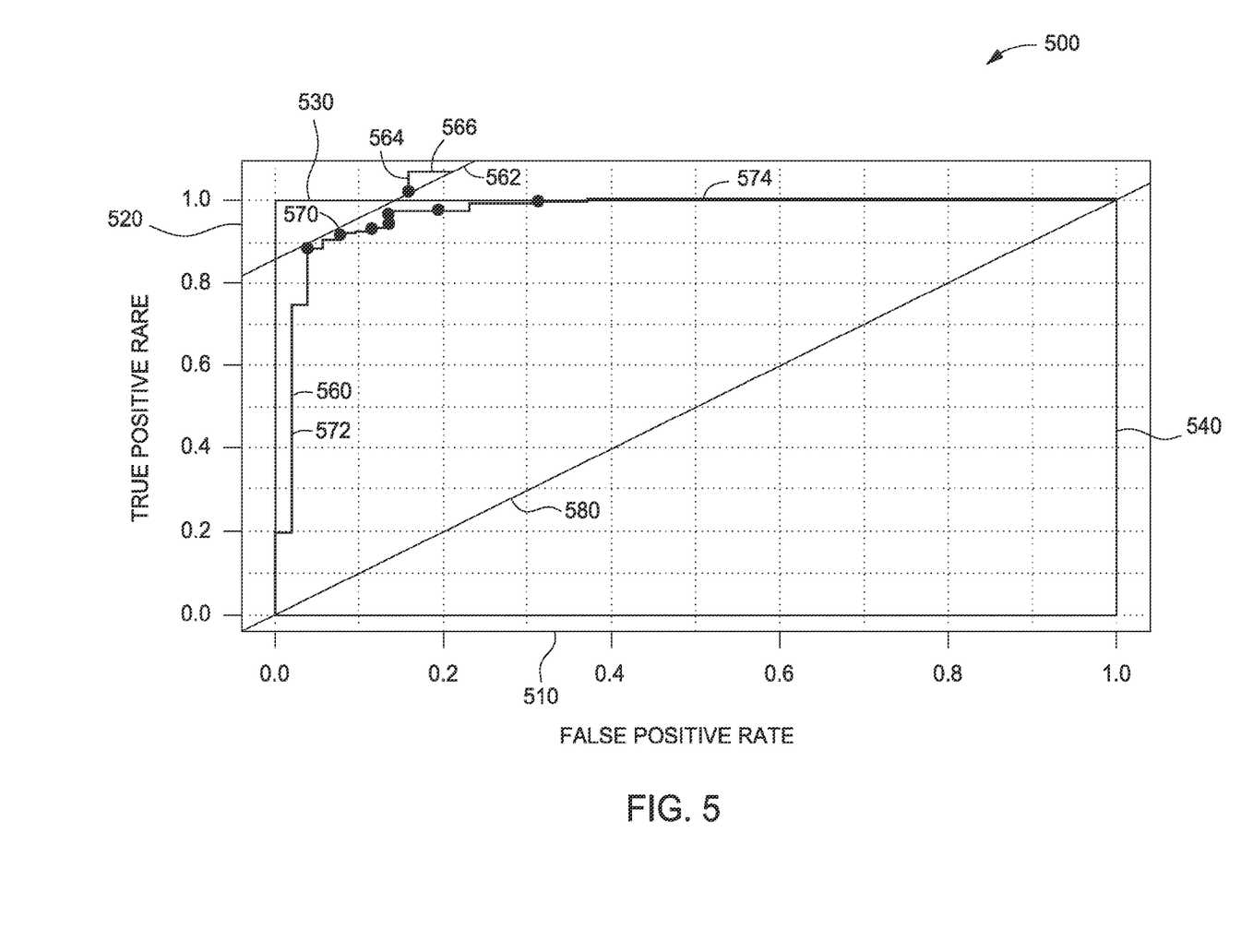
FIG. 5 illustrates a plurality of receive operating characteristic (ROC) curves overlaid with a ROC for a chamber component of the processing chamber in FIG. 3.
Figure 6:
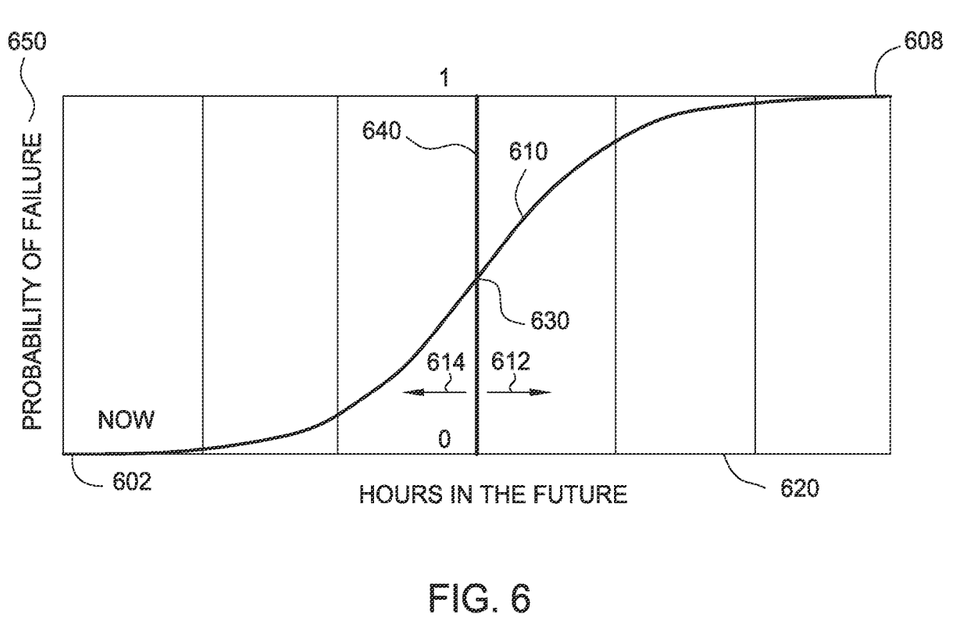
FIG. 6 illustrates a survival function for the chamber component of FIG. 5.

The predictive techniques for the PdM system 200 are captured in FIG. 4. FIG. 4 illustrates a method for determining when to perform maintenance events. The method 400 disclosed in FIG. 4 will be discussed in conjunction with FIGS. 5 and 6. FIG. 5 illustrates a plurality of receive operating characteristic (ROC) curves overlaid with a ROC curve for a chamber component of the processing chamber in FIG. 3. FIG. 6 illustrates a survival function for the chamber component depicted in the ROC curve of FIG. 5.

In step 410, a first cost of false positives and a second cost of missed true positives are determined. The false positive indication in the predictive maintenance system may indicate bringing a tool down, process, production or other equipment down when it does not need the repair we specify. The cost associated with the false positive indication can be provided by a process owner. The true positive indication in the predictive maintenance system correctly predicts the timing of a maintenance event. "Missing" the true positive prediction may result in an unscheduled downtime when a component or part of the system break, wears or causes inconsistencies in the production process. The cost associated with missing the true positive prediction can be provided by the process owner as well. Some process owners may be reluctant to release cost figures or may not even know them. However, the ratio of the first cost and the second cost can be used in its stead to maintain confidentiality for process/business operations.

In step 420, a Receive Operating Characteristic (ROC) of a prediction model is determined for the occurrence of an event. The prediction model is determined for a prediction of a failure type associated with the one or more maintenance events. The ROC is created by plotting the true positive predictions (TPP), i.e., the fraction of true positives predictions out of the total actual positives predictions, vs. the false positive predictions (FPP), i.e., the fraction of false positive predictions that maintenance is needed out of the total actual positive predictions. The ROC illustrates a tradeoff between the FPP and the TPP.

FIG. 5 illustrates several (ROC) curves. The true positive predictions (TPP) 520 is plotted on the y-axis and the false positive predictions (FPP) 510 are plotted on the x-axis. A 100% accurate prediction rate is depicted by a ROC curve 530. In the scenario of the perfectly accurate ROC curve, i.e., the ROC curve 530, all positive predictions for the occurrence of a maintenance event are true, i.e., accurate. Likewise, a 100% inaccurate prediction rate is depicted by a ROC curve 540. The scenario of a perfectly inaccurate ROC curve, i.e., the ROC curve 540, has all positive predictions for the occurrence of the maintenance event as being false, i.e., wrong or inaccurate. Thus, a metric for comparison of prediction capabilities may be determined by calculating the area under the curve. An area of zero, such as that for the ROC curve 540, is indicative of poor predictive capabilities. An area of 1, such as that for the ROC curve 530, is indicative of excellent predictive capabilities. A ROC curve typically may have an area greater than about zero and about less than about one. For example, a ROC curve 560 is for a chamber component and has an area under the curve of about 0.97. The area under the curve is equal to the probability that the true positive prediction for the occurrence of the event. A diagonal line 580 through the center of the graph is a "flip-of-the-coin" accuracy. It is generally true that the ROC curve should reside above this diagonal line 580. However the amount the ROC curve is above the diagonal line is a function of the financials. Thus, even a little above the diagonal line 580 may provide benefits in some cases and the benefits vary from application to application.

The FPP unnecessarily calls for a maintenance event when the event was not needed adding to operational costs. For example, the FPP may call for the shutting down of a processing equipment to replace a worn and/or contaminated component which in reality was still within specification (or would have been within specifications at the future predicted time of failure) and could have continued being used in the processing equipment beyond the predicted failure time without significant detriment. Thus, there is a cost associated with the unnecessary downtime to inspect, maybe replace, and restart the processing equipment. The greater the area under the ROC curve, the less the less FPP. Likewise, missing a TPP results in unscheduled downtime and has associated costs.

Figure 7:
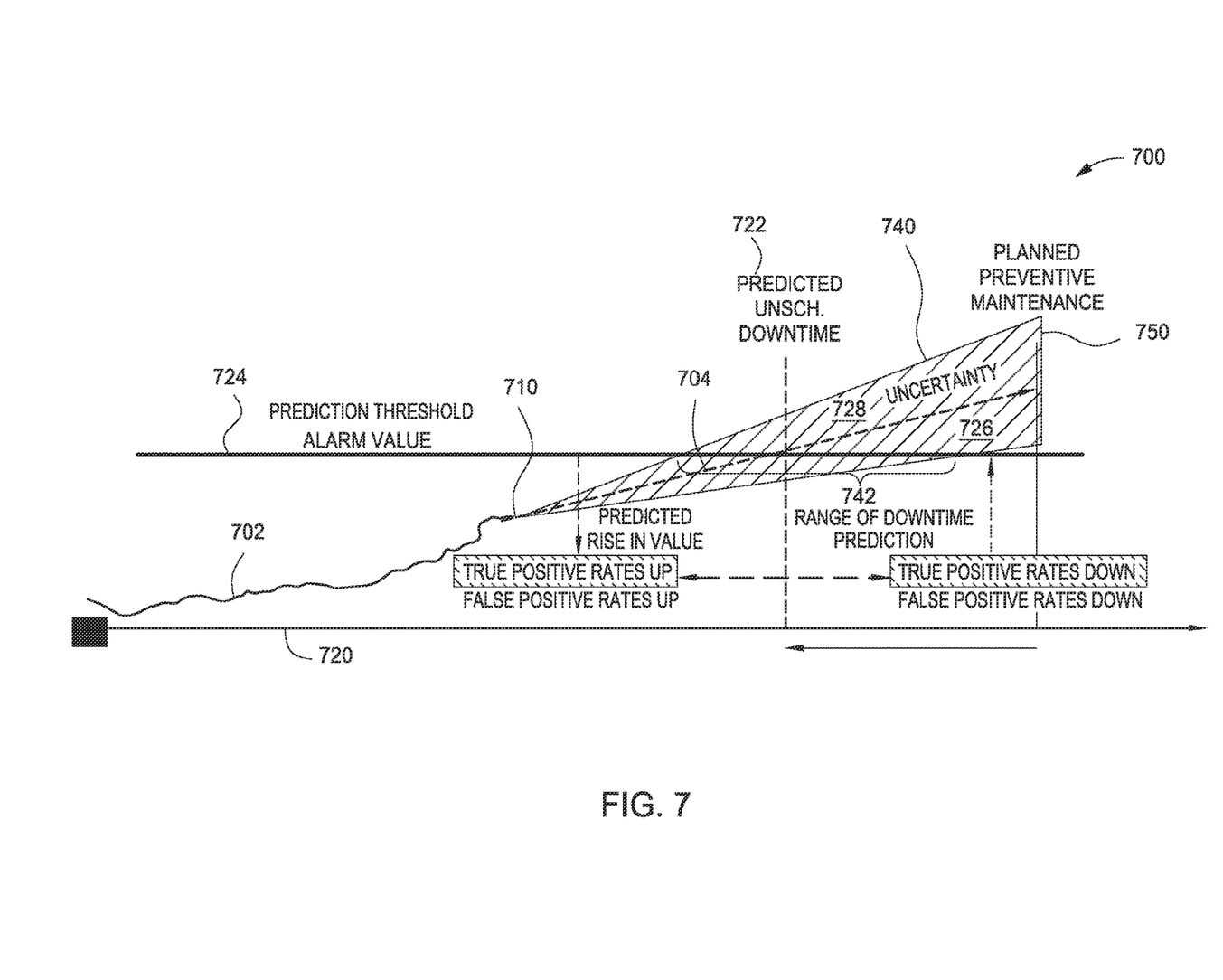
FIG. 7 illustrates a prediction horizon projecting a health of the chamber component over time with uncertainty.

In step 430, a survival function (See FIG. 6) is determined from the prediction model for the occurrence of an event. The survival function 610 is a probability function of the potential for the downtime event occurring in the future. The survival function 610 captures the probability that the system will survive beyond a specified time. This is related to the Remaining Useful Life (RUL). The RUL may be determined by a mean value analysis, a true value analysis, a Monty Carlo analysis, or by other suitable means. However, the survival function is focused on the probability of failure growing over time rather than determining the RUL. An alternative view of the RUL is illustrated in FIG. 7.

FIG. 6 illustrates a survival function 610 for a chamber component associated with the ROC curve 560 shown in FIG. 5. The survival function 610 maps a set of predictions (such as point 630 along the survival function 610) which may be associated with the failure of the system onto a time line 620. That is, the survival function 610 captures the probability that the system will survive beyond a specified time, i.e., a predicted unscheduled downtime. The survival function 610 starts at a current point in time 602 and plots a probability of failure 650 to a future point in time 608. The survival function 610 may be a curve, linear, symmetrical or asymmetrical among other representations.

Moving a threshold time 640 for the predictions in a right direction 612 or a left direction 614 changes the ratio of the false positives to the missed true positives. The true positive prediction rates go up and the false positive rates go up as the threshold time 640 moves to the left 614. Likewise, the true positive prediction rates go down and the false positive rates go down as the threshold time 640 moves to the right 612.

In step 440, the ROC and the operational area on the ROC is determined based on an optimal or desired prediction time, or an optimal prediction in a desired prediction time range. The operational area is determine by the confluence of the relative cost for the false positive and the missed true positives as shown on the ROC curve 560 (FIG. 5). Operating in the operation area minimizes the risk while maximizing the benefit of the predictive maintenance system. For example, along the ROC curve 560, a high slope area 572 (where the slope approaches infinity) has a high cost of false positives, while a low slope area 574 (where the slope approaches zero) has a high cost of missed true positives.

The cost of false positives and the cost of missed true positives, both determined earlier, are used to set an acceptable range which to operate in. Additionally, the aggressiveness of the tradeoff between the cost of false positives and the cost of missed true positives may bias the acceptable range to align with business considerations. The operational range on an ROC is determined from the minimum net benefit that the user determines must be provided per downtime event of the type being predicted in the ROC. Every point on the ROC where the TPP frequency benefit minus the FPP cost is greater than the minimum required net benefit is within the acceptable operational range. Note that it is possible that no points on the ROC are within the acceptable operational range. In this case the PdM system cannot provide the minimum required net benefit in its current form. The solution would only be usable if the ROC can be improved. This can be achieved through methods including (1) model strengthening, (2) changing the desired prediction time or time range to a time or time range that provides for a more optimal prediction model, or (3) reducing the minimum required net benefit.

In step 450, the threshold time 640 is determined from the ROC and applied to the survival function 610. The threshold time 640 may be derived using customer data for costs of unscheduled downtime, scheduled downtime, cost of bring a tool or process down, and the comparing the data to the ROC curve. The threshold time 640 then determines at which time the tool or process should be brought down for maintenance. We can set the "aggressiveness" of the prediction to obtain a balance between False Positives and Missed True Positives.

For example, the relative cost for unscheduled downtime for a targeted downtime event ($UDT) may be obtained along with the relative cost of scheduled downtime for a targeted downtime event ($SDT). Generally the $UDT is greater than the $SDT when there is a benefit for a true positive prediction. The cost of a downtime for a tool/process when there is nothing wrong with the tool ($NWDT) is the cost of a false positive prediction. A ratio (R1) may be determined for the cost of the tool, machine, or process coming offline when there is nothing wrong with it ($NWDT) divided by the difference between the cost for unscheduled downtime ($UDT) and scheduled downtime ($SDT), i.e., R1=$NWDT/($UDT−$SDT). The ratio assumes the $UDT is greater than the $SDT. The relative cost may therefore be calculated by the ratio (R1) of a $NWDT cost associated with nothing wrong down time divided by the difference of a $UDT cost associated with unscheduled occurrence of an event and a $SDT cost associated with the scheduled occurrence of an event.

Alternately, ($UDT−$SDT)−$NWDT may be calculated based on available information. An optimal point 570 is calculated to be on the ROC curve 560 where ($UDT−$SDT)*TPP−$NWDT*FPP is maximized. The optimal point 570 is the balance where false positives to missed positive are best aligned with the cost benefit of downtime options. If the ROC curve 560 has a continuous and monotonic first derivative, then the value for the optimal point 570 may be substantially similar to where the derivative (slope) 562 of the ROC is equal to the ratio R1.

A slope 562 is the change of the rise 564 over the run 566 for the ROC curve 560. The slope 562 may be used to determine the threshold time 640 or alarm value for the survival function 610 when the slope is about equal to the ratio R1. The slope 562 is a first derivative of ROC curve (560 in FIG. 5) and may be determined utilizing some smoothing. A smoothing function may be applied to the ROC curve 560 in determining the slope 562. A smoothed ROC may be formed by applying a smoothing function to the ROC. The slope 562 may be assumed to be a monotonic function moving from infinity to zero and filtering can be applied to get a smooth curve. The smoothed ROC may have a first derivative (slope 562) that is continuous and monotonically decreasing. The optimal point 570 is determined on the ROC curve 560 based on the first cost, the second cost, a cost ratio and the first derivative of the smoothed ROC.

The threshold time 640 is determined by the point on the survival function 610 that corresponds to the calculated point on the ROC, i.e., the point where the ratio R1 is equal to the first derivative (slope 562) of the ROC curve 560. The threshold time 640 may be further adjusted based on a cost analysis between the unscheduled occurrence of the event and a scheduled occurrence of the event. Moving to the right or left of a predicted downtime probability function changes the ratio of false positive to missed true positive. Adjusting the threshold toward increasing the unscheduled occurrence of the event decreases the missed true positives and the false positives. Thus, the point 630 along the survival function 610 is determined for events in the future where the ratio R1 is substantially equal to the first derivative of the ROC curve 560 at the optimal point 570 and the threshold, or trigger, is set to that optimal point 570.

In step 460, a maintenance event is triggered based on the threshold determined above. Additionally, the threshold may be made sensitive to dynamic, or live changes in the system. Sensitivity analysis may be incorporated which would result in slight adjustments of prediction times and/or slight adjustment of benefit assessment. Utilizing fault detection to determine a current state in the survival function the trigger, or threshold, may be modified based on a current state.

FIG. 7 illustrates a prediction horizon 700 projecting a health of the chamber or chamber component over a timeline 720 with uncertainty 740. A health indicator 710 graphs the health of the chamber or chamber component. The health indicator 710 may have actual data 702, representative of time elapsed and predicted data 604, representative of a future along the timeline 720. There may be uncertainty 740 associated with each point in the timeline 720 along a plurality of predicted values 704 while there is no uncertainty for the actual data 702, i.e., the past. That is, the uncertainty 740 starts at the beginning of the predicted values 704 for the health indicator 710. As the prediction moves further into the future, i.e., as it approaches the planned preventative maintenance, the uncertainty 740 may grow. The uncertainty 740 is shown as a shaded portion of the graph above and below the predicted values 704 of the health indicator 710. The uncertainty 740 may therefore be determined for the occurrence of the event.

A prediction cone 750 is one method of representing this uncertainty 740. Another method is a probability distribution function. Knowledge of uncertainty in the prediction can be used to further optimize a threshold 724 to the financial environment. The prediction cone 750 may not always be symmetrical and the cost of an error on a lower half 726 may be greater than the cost of an error on a higher half 728, or vise versa. For example, if cost of the actual signal being in a lower half 726 of the prediction cone 750 (below the mean predicted value 704) is much higher than being in a higher half 728, the threshold 724 should be lowered for a more optimal solution. In one embodiment and evaluation approach, such as a Monte Carlo simulation, is used to evaluate the benefit and probability of occurrence across the vertical expanse of the prediction cone 750 or probability distribution function associated with the prediction to determine the optimal vertical placement in the prediction cone 750 or the probability function corresponding to the financial benefit of the PdM application. The prediction horizon 700 the optimal point 570 and the threshold 724 are derived utilizing an expected value of the predictor in a future and an indication of a range of possible values in the future along with a probability of these values.

A range of downtime prediction 742 may be associated with the prediction threshold/alarm value 724. Within the range of downtime prediction 742, a predicted unscheduled downtime 722 may be determined based on the associated costs of true positive predictions (left of the predicted unscheduled downtime 722) and associated costs of false positive predictions (right of predicted unscheduled downtime 722). Moving the predicted unscheduled downtime 722 right or left adjusts scheduled downtime along the timeline 720 but also impacts the associated costs discussed above.

Maintenance data quality issues, correctness of data, number of occurrences of an event, interference from disturbances such as other downtime events and recipe changes may all affect the calculation of the ROC, survival function and cost functions. However, real benefits for the predictive system may be determined for a customer. From the chosen downtime recommendation on the survival function, the False Positive Rate (FPR) may be determined as well as the missed True Positive Rate (MTPR=1−TPR). Benefit may be determined for events that don't have a scheduled maintenance. For example, before predictive maintenance, the cost per year is equal to the average number of downtimes per year times×$UDT; and after predictive maintenance, the benefit per year is equal to the average number of downtimes per year times {TPR×($UDT−$SDT)−FPR×$NWDT}.

Thus, the PdM system advantageously reduces scrap rates while increasing quality, reduces overall downtime and mean-time-to-repair, increases the throughput and factory capacity (i.e., productivity), enables more efficient just-in-time management of spare chamber components which reduces costs and frees warehousing space, and reduces costly damage to equipment and equipment components.

The examples above focuses on Predictive Maintenance however, it should be understood that it can also be applied to Predictive scheduling, Predictive yield and Predictive metrology (virtual metrology, VM) among other predictive techniques. General process can be applied to other prediction domains however the objectives and methods may vary slightly to significantly depending on the domain.

For example, predictive scheduling is similar to predictive maintenance. In predictive scheduling the survival function would be used to predict the need for a change in the schedule in the future. A cost function would weigh the costs of a false positive (schedule change not needed, but made) and missed true positive (schedule change was needed, but not made). There may be multiple types of decisions and decision costs in this prediction strategy.

In another example using predictive yield, an action may be taken as the result of a prediction of an under-yielding system, such as bringing a tool or line down. If so, the calculation would proceed in the same manner as predictive maintenance. In yet another example using predictive metrology (virtual metrology, VM), the VM may be used to trigger the use of real metrology to cost comparison, the predictive system may use lost throughput vs. potential lost yield.

Thus, the benefits of predicting and avoiding unscheduled downtime will out-weight the costs associated with occasional missed forecasts by a PdM system resulting in unnecessary scheduled downtime. Unscheduled maintenance events that are frequent and costly are converted to scheduled maintenance events. Regularly maintenance events that are scheduled by time or part count are converted to event scheduling to increase uptime and reduce the cost of consumables.

While the foregoing is directed to embodiments of the present disclosure, other and further embodiments can be devised without departing from the basic scope thereof, and the scope thereof is determined by the claims that follow.

The invention claimed is:

1. A computer implemented method for determining when to perform maintenance events, the method comprising:
    determining a first cost of false positives and a second cost of missed true positives;
    determining a Receive Operating Characteristic (ROC) of a prediction model for an occurrence of one or more maintenance events;
    generating a survival function from the prediction model for the occurrence of an event;
    determining an operational area on the ROC based on the first costs and second costs;
    determining a threshold from the ROC, the operational area and an optimal point and applying the threshold to the survival function and prediction horizon; and
    triggering a maintenance event based on the threshold.

2. The computer method of claim 1, wherein the prediction model is determined for a prediction of a failure associated with the one or more maintenance events.

3. The computer method of claim 2, further comprising:
    determining a smoothed ROC, formed by applying a smoothing function to the ROC, that has a first derivative that is continuous and monotonically decreasing, and wherein the optimal point is determined on the ROC based on the first cost, the second cost, a cost ratio and a derivative of the smoothed ROC.

4. The computer method of claim 3, wherein the prediction horizon, the optimal point and the threshold are derived utilizing an expected value of a predictor in a future and an indication of a range of possible values in the future along with a probability of these values.

5. The computer method of claim 3, further comprising:
    determining an uncertainty for the occurrence of the maintenance events.

6. The computer method of claim 5, further comprising:
    adjusting the threshold based on a cost analysis between an unscheduled occurrence of the event and a scheduled occurrence of the event.

7. The computer method of claim 6, wherein the cost analysis comprises:
    calculating a ratio of the first cost divided by the second cost.

8. The computer method of claim 7, wherein the first cost is a $NWDT cost associated with nothing wrong down time and the second cost is a difference of a $UDT cost associated with the unscheduled occurrence of the event and a $SDT cost associated with the scheduled occurrence of the event.

9. The computer method of claim 7, further comprising:
    determining a point along the survival function for events in a future where the ratio is substantially equal to a first derivative of the smoothed ROC; and
    setting the trigger to said point.

10. The computer method of claim 1 further comprising:
    utilizing fault detection to determine a current state in the survival function; and
    modifying the trigger based on the current state.

11. A computer-readable storage medium storing a program, which, when executed by a processor performs an operation for determining when to perform maintenance events, the operation comprising:
    determining a first cost of false positives and a second cost of missed true positives;
    determining a Receive Operating Characteristic (ROC) of a prediction model for an occurrence of one or more maintenance events;
    generating a survival function from the prediction model for the occurrence of an event;
    determining an operational area on the ROC based on the first costs and second costs;
    determining a threshold from the ROC, the operational area and an optimal point and applying the threshold to the survival function and prediction horizon; and
    triggering a maintenance event based on the threshold.

12. The computer-readable storage medium of claim 11, wherein the prediction model is determined for a prediction of a failure associated with the one or more maintenance events.

13. The computer-readable storage medium of claim 12, further comprising:
    determining a smoothed ROC, formed by applying a smoothing function to the ROC, that has a first derivative that is continuous and monotonically decreasing, and wherein the optimal point is determined on the ROC based on the first cost, the second cost, a cost ratio and a derivative of the smoothed ROC.

14. The computer-readable storage medium of claim 13, wherein the prediction horizon, the optimal point and the threshold are derived utilizing an expected value of a predictor in a future and an indication of a range of possible values in the future along with a probability of these values.

15. The computer-readable storage medium of claim 13, further comprising:
    determining an uncertainty for the occurrence of the maintenance events.

16. The computer-readable storage medium of claim 15, further comprising:
    adjusting the threshold based on a cost analysis between an unscheduled occurrence of the event and a scheduled occurrence of the event.

17. The computer-readable storage medium of claim 16, wherein the cost analysis comprises:
    calculating a ratio of the first cost divided by the second cost.

18. The computer-readable storage medium of claim 17, wherein the first cost is a $NWDT cost associated with nothing wrong down time and the second cost is a difference of a $UDT cost associated with the unscheduled occurrence of the event and a $SDT cost associated with the scheduled occurrence of the event.

19. The computer-readable storage medium of claim 17, further comprising:
    determining a point along the survival function for events in a future where the ratio is substantially equal to a first derivative of the smoothed ROC; and
    setting the trigger to said point.

20. The computer-readable storage medium of claim 11 further comprising:
    utilizing fault detection to determine a current state in the survival function; and
    modifying the trigger based on the current state.

* * * * *